United States Patent [19]

Maekawa et al.

[11] Patent Number: 5,149,136
[45] Date of Patent: Sep. 22, 1992

[54] SHOULDER ADJUSTER

[75] Inventors: Tetsuya Maekawa; Yuichi Nanbu; Noriyuki Kosugi, all of Shiga, Japan

[73] Assignee: Takata Corporation, Tokyo, Japan

[21] Appl. No.: 744,693

[22] Filed: Aug. 13, 1991

[30] Foreign Application Priority Data

Sep. 5, 1990 [JP] Japan ................... 2-235060

[51] Int. Cl.$^5$ .............................. B60R 22/20
[52] U.S. Cl. .................... 280/808; 297/483; 297/486
[58] Field of Search ............ 280/801, 808, 802; 297/468, 473, 483, 486

[56] References Cited

U.S. PATENT DOCUMENTS

| | | | |
|---|---|---|---|
| 4,640,550 | 2/1987 | Hakansson | 280/808 |
| 4,720,147 | 1/1988 | Takada | 280/808 |
| 4,818,023 | 4/1989 | Griesemer | 280/808 |
| 4,872,704 | 10/1989 | Biller et al. | 280/808 |
| 4,917,403 | 4/1990 | Gyoda et al. | 280/808 |

FOREIGN PATENT DOCUMENTS 2176091 12/1986 United Kingdom .

Primary Examiner—Kenneth R. Rice
Attorney, Agent, or Firm—Kanesaka and Takeuchi

[57] ABSTRACT

Disclosed is a shoulder adjuster comprising: a guide rail fitted so that the longitudinal direction is set as a vertical directions to a vehicle and provided with a plurality of notches formed at intervals in the longitudinal direction; and a slide member slidable in the longitudinal direction of the guide rail and having engaging parts engaging with the notches and a shoulder anchor fitting part. The guide rail consists of a synthetic resin guide rail and a metal guide rail so that the slide member engages with the synthetic resin guide rail during an emergency, and during a non-emergency the synthetic resin guide rail is deformed to make the slide member engage with the metal guide rail.

9 Claims, 12 Drawing Sheets

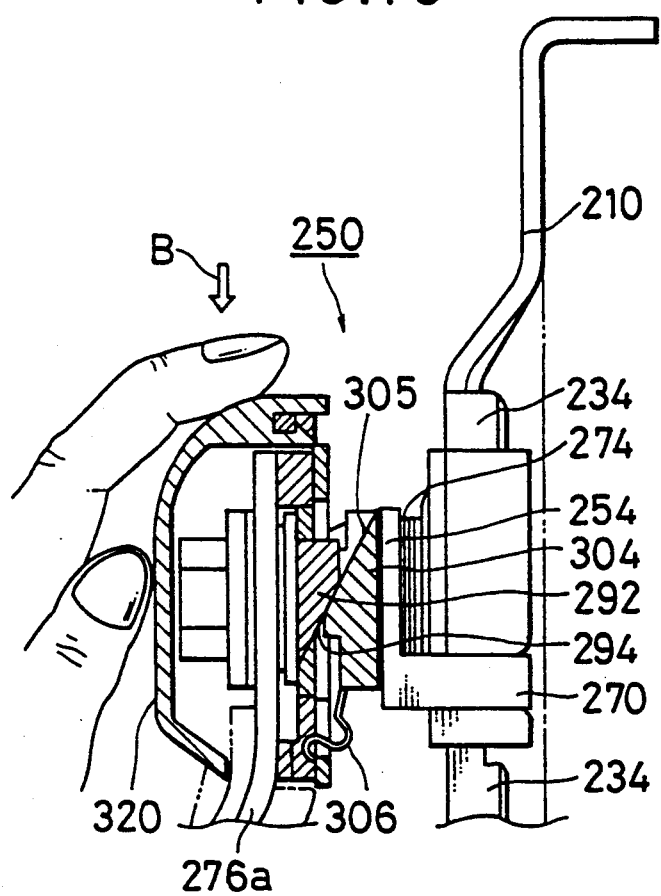

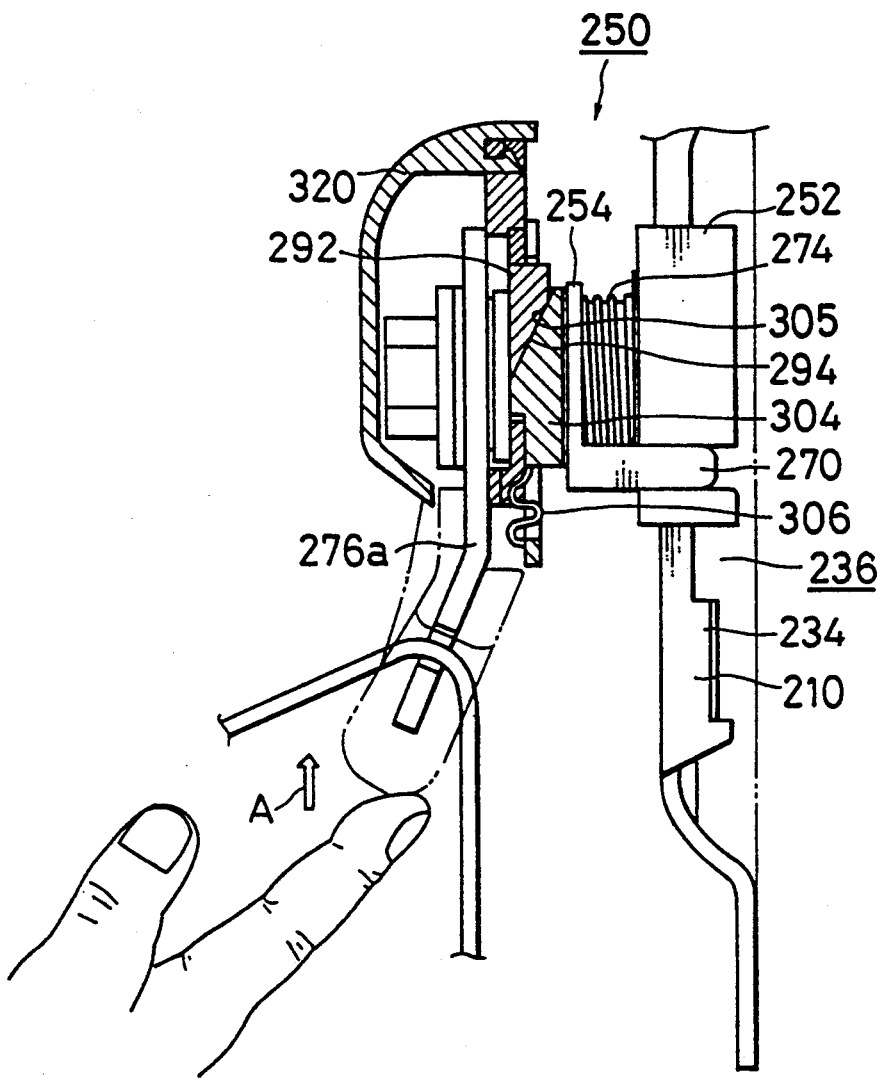

SHOULDER ADJUSTER

BACKGROUND OF THE INVENTION

1. Field of the Invention

The present invention relates generally to a shoulder adjuster for use with a seat belt device for restraining and protecting seat occupants in the event of emergency such as a vehicle collision, and more particularly, to a shoulder adjuster of the seat belt for restraining the occupants on the front seats of, e.g., an automobile.

2. Description of the Prior Art

The following is one arrangement of the seat belt devices for protecting occupants on the front seats of, e.g., an automobile. A shoulder adjuster is fitted to a center pillar of the automobile. A seat belt is folded back by a shoulder anchor attached to the shoulder adjuster, whereby the seat belt can be fed out to the seat occupant.

This shoulder adjuster is constructed to make a height of the shoulder anchor variable corresponding to a seated height of the occupant and a body shape thereof. The shoulder adjuster includes a guide rail extending in the up-and-down directions and a slide member slidable along the guide rail. The shoulder anchor is attached to the slide member.

One example of the shoulder adjuster will be given (U.S. Pat. No. 4,398,749). The guide rail is formed with a multiplicity of notches at intervals in the longitudinal direction. The slide member has engaging parts with the notches and an elastic member for biasing the engaging parts in the engaging direction. Lower cut-in edge parts of the notches are substantially orthogonal to the longitudinal direction. Upper cut-in edge parts are so obliquely orthogonal to the longitudinal direction as to expand apertures of the notches.

In the shoulder adjuster of the foregoing patent having same serial number, when the slide member is biased upwards, the engaging parts move while running over the upper cut-in edge parts (inclined to the longitudinal direction) of the notches. The slide member slides upwards. When an external force acting downward from the seat belt is applied to this slide member, the engaging parts are engaged with the lower cut-in edge parts (substantially orthogonal to the longitudinal direction) of the notches. Downward sliding of the slide member is thereby hindered.

Note that the shoulder adjuster of the foregoing patent with the same serial number is provided with a member dedicated to thrust the engaging parts in a direction opposite (hereinafter referred to as a release direction) to the engaging direction. When pushing this member, the engagement of the engaging parts with the notches is released, whereby the slide member is slidable downwards.

In the conventional shoulder adjuster, there exists a metal touch between the slide member and the guide rail, resulting in large working sounds. As a thinkable contrivance, a synthetic resin lining may be effected on the slide surface between those two components. If a large load is applied in the event of emergency in the vehicle, this synthetic resin lining is damaged. This presents a problem in which the working sounds are thereafter produced from this damaged portion.

As described above, the shoulder adjuster of U.S. Pat. No. 4,398,749 requires the member for thrusting the engaging parts in the release direction. This member is disposed upwardly of the anchor fitting part. Hence, a pull-down of the slide member involves two steps of lowering the slide member in the downward direction while pushing this member. This shoulder adjuster is therefore hard to use.

The device of the foregoing patent with the same serial number presents the following drawback. The user can not recognize that the slide member is slidable downwards by pushing the dedicated member unless the user reads thoroughly the operation manual or repeatedly makes a variety of trials and errors, resulting in a difficulty to comprehend the operating method.

OBJECT AND SUMMARY OF THE INVENTION

It is a primary object of the present invention to provide a shoulder adjuster capable of reducing working sounds.

It is another object of the present invention to provide a shoulder adjuster capable of easily pulling down a slide member.

It is still another object of the present invention to provide a shoulder adjuster capable of presenting an easy-to-comprehend operating method.

To accomplish the foregoing objects, according to a first mode of the invention, there is provided a shoulder adjuster comprising: a guide rail fitted so that the longitudinal direction is set as a vertical direction to a vehicle and provided with a plurality of notches formed at intervals in the longitudinal direction; and a slide member slidable in the longitudinal direction of the guide rail and a having engaging parts engaging with the notches and a shoulder anchor fitting part, characterized by the guide rail being consisted of a synthetic resin guide rail and a metal guide rail so that the slide member engages with the synthetic resin guide rail during an emergency, and during a non-emergency the synthetic resin guide rail is deformed to make the slide member engage with the metal guide rail.

In the shoulder adjuster according to the first mode, the shoulder adjuster according to a second mode is arranged such that a slide surface of the slide member with respect to the synthetic resin guide rail is composed of a synthetic resin.

In the shoulder adjuster according to the first or second mode, the shoulder adjuster according to a third mode is arranged such that the notches of the synthetic resin guide rail have cut-in edge parts, the lower cut-in edge parts in up-and-down directions are substantially orthogonal to the longitudinal direction of the guide rail, and the upper cut-in edge parts in the up-and-down directions are obliquely orthogonal to the longitudinal direction thereof to expand apertures of the notches; and that the slide member includes the anchor fitting part possible of advancement and retreatment in the engaging direction and an elasticc member for biasing the anchor fitting part in the engaging direction, and the engaging parts are integral with the anchor fitting part and biased by the elastic member in the engaging direction.

In the shoulder adjuster according to the first or second mode, the shoulder adjuster according to a fourth mode is arranged such that the notches of the synthetic resin guide rail have cut-in edge parts, the lower cut-in edge parts in the up-and-down direction are substantially orthogonal to the longitudinal direction of the guide rail, and the upper cut-in edge parts in the up-and-down direction are obliquely orthogonal to the longitudinal direction thereof to expand apertures of the notches; and that the slide member includes engaging parts so provided on the anchor fitting part as to be advanceable and retreatable in the engaging direction and also an elastic member for biasing the engaging parts in the engaging direction, and the engaging parts are provided separately from the anchor fitting part and biased by the elastic member in the engaging direction.

In the shoulder adjuster according to the first or second mode, the shoulder adjuster according to a fifth mode is arranged such that the notches of the synthetic resin guide rail have cut-in edge parts, the lower cut-in edge parts in up-and-down directions are substantially orthogonal to the longitudinal direction of the guide rail, and the upper cut-in edge parts in the up-and-down directions are obliquely orthogonal to the longitudinal direction thereof to expand apertures of the notches; and that the slide member includes: a pressure receiving member, having an inclined pressure receiving surface inclined upwards in the up-and-down directions with respect to the engaging directions of the engaging parts, for pressing the engaging parts in such a direction as to release form the notches during a shift in the engaging direction, an elastic member; an elastic member for biasing the engaging parts in the engaging direction; and an operator having an inclined pressurizing surface slide-contacting the inclined pressure receiving surface and advanceable and retreatable in the up-and-down directions.

In the shoulder adjuster of the present invention, the slide member engages with the synthetic resin guide rail in the event of emergency, whereby the working sounds become small. The synthetic resin guide rail is deformed when the emergency happens in the vehicle. The slide member engages directly with the metal guide rail to provide rigid holding. It is therefore possible to strongly restrain the seat occupants in the vehicle. When a large load during the vehicle emergency is released, the synthetic resin guide rail reverts to its original configuration, and the slide member engages with the synthetic resin guide rail.

In the shoulder adjuster according to the second mode, the synthetic resin surface of the slide member engages with the synthetic resin guide rail. Most of the working sounds disappear, and at the same the operation is more smoothed.

The shoulder adjuster according to the third mode eliminates the necessity for the member for thrusting the engaging parts in the release direction. When intruding the anchor fitting part, the engaging parts release from the notches. The slide member slides downwards as it is. Hence, the slide member can be slid downwards by the single step of lowering the anchor fitting part while intruding it.

In the shoulder adjuster according to the fourth mode, the anchor fitting part is provided separately from the engaging parts. Therefore, a small amount of operating force may suffice for pressing the engaging parts.

In the shoulder adjuster according to the fifth mode, when pushing down the operator, the inclined pressurizing surface of the operator pushes the inclined pressure receiving surface of the pressure receiving member. The engaging parts are thereby released form the notches, and the slide member slides downwards. Hence, the slide member can be slid downwards by the single step of pushing down the operator.

In the shoulder adjuster according to the third, fourth and fifth modes, the engaging parts engage with the notches upon releasing the anchor fitting part from the hand. The slide member is locked to the guide rail, thereby pretecting the seat occupant. Whereas the anchor fitting part is pushed up, as in the same way with U.S. Pat. No. 4,398,749, the engaging parts run over the upper side edge parts of the notches, whereby the slide member slides upwards.

BRIEF DESCRIPTION OF THE DRAWINGS

Other objects and advantages of the present invention will become apparent during the following discussion taken in conjunction with the accompanying drawings, in which:

FIGS. 16 and 17 are views of assistance in explaining the operation of the shoulder adjuster.

DETAILED DESCRIPTION OF THE PREFERRED EMBODIMENT

Embodiments of the present invention will hereinafter be described with reference to the accompanying drawings.

Figure 1:
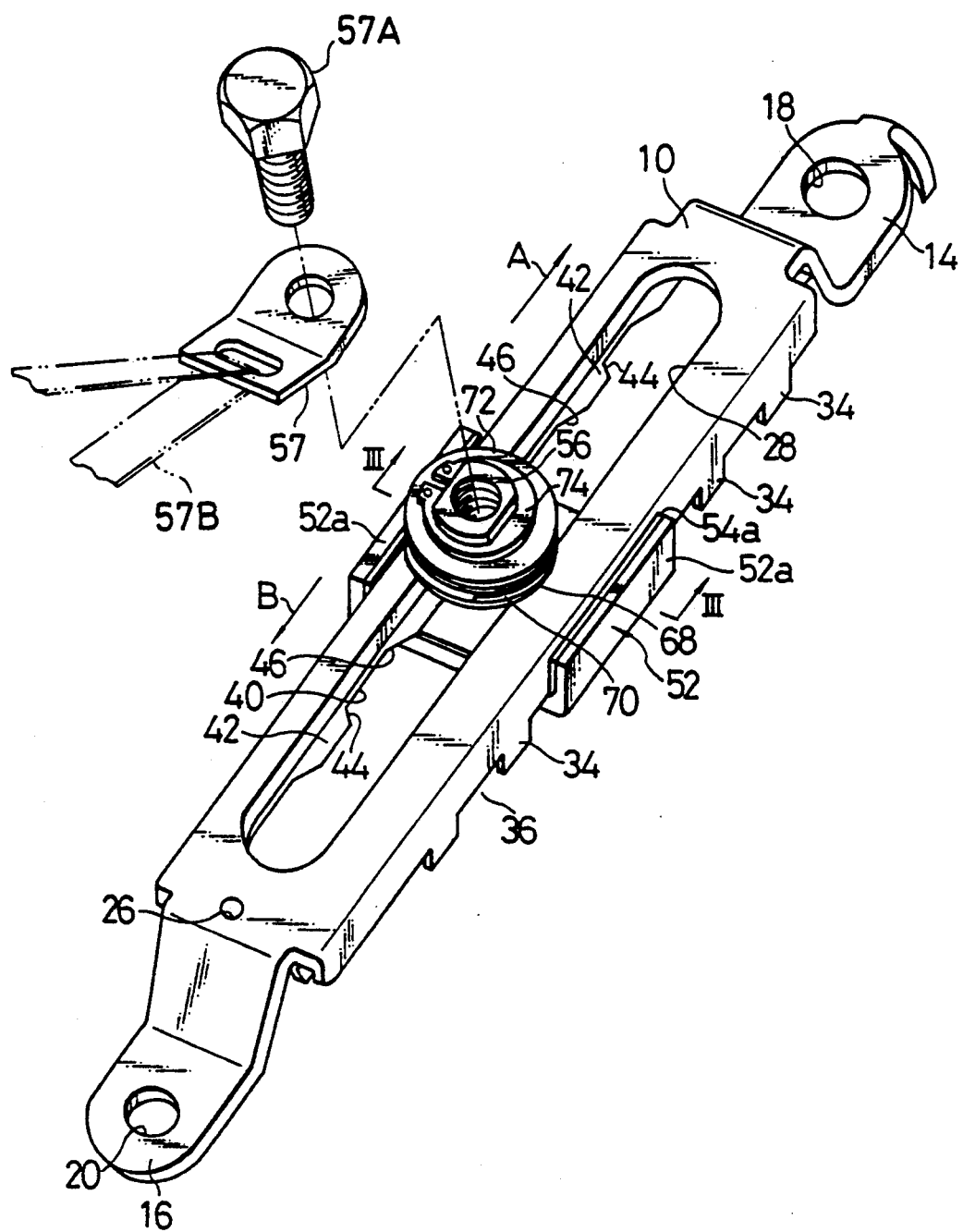
FIG. 1 is a perspective view illustrating a shoulder adjuster in an embodiment of the present invention.
Figure 2:
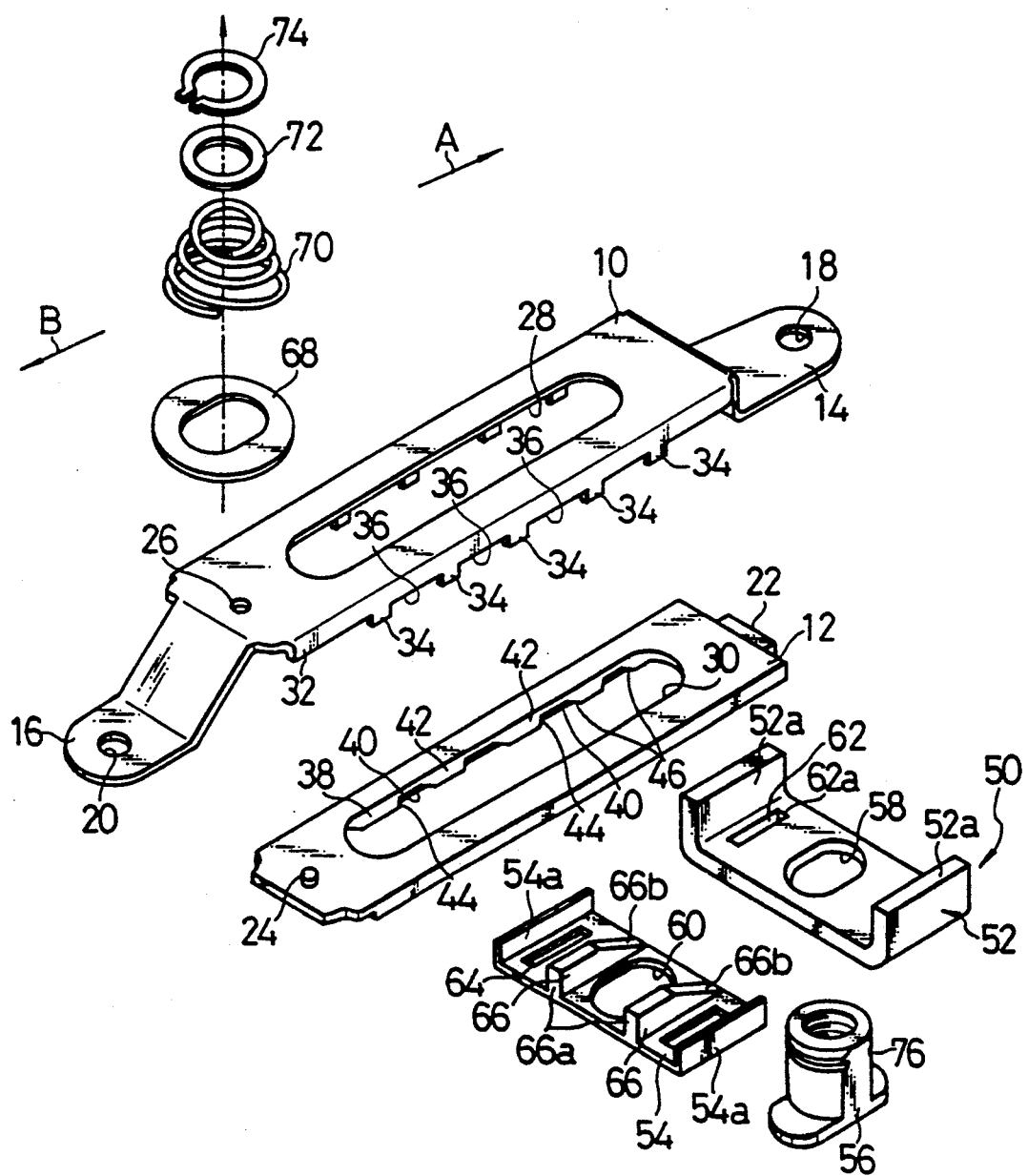
FIG. 2 is an exploded perspective view depicting the same adjuster.
Figure 3:
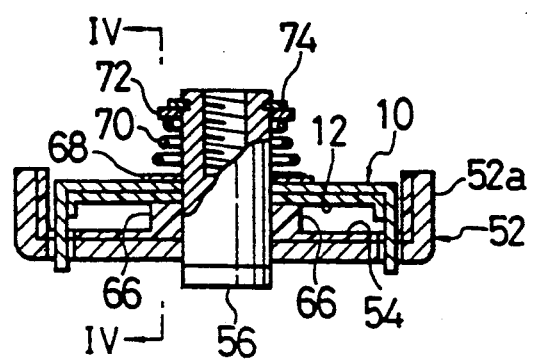
FIG. 3 is a sectional view showing the same shoulder adjuster.
Figure 4:
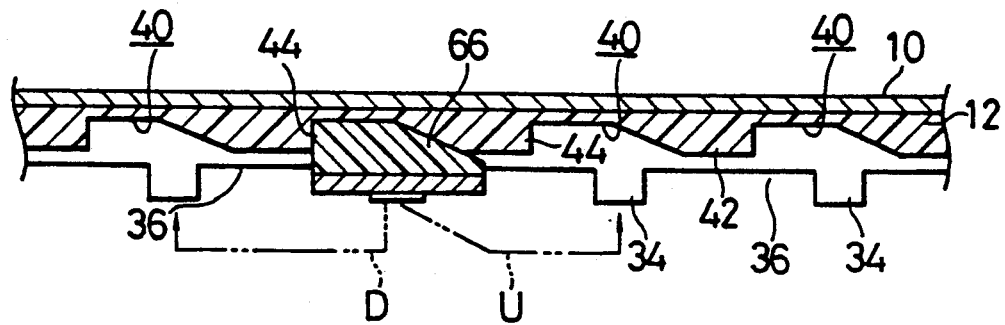
FIG. 4 is a sectional view of assistance in explaining the operation.

FIG. 1 is a perspective view illustrating a shoulder adjuster in a third mode of the embodiment of the present invention. FIG. 2 is an exploded perspective view. FIG. 3 is a sectional view taken substantially along the line III—III of FIG. 1. FIG. 4 is an operation explanatory partial sectional view taken substantially along the line IV—IV of FIG. 3 in the longitudinal direction of a guide rail.

To start with, the components, will be explained referring mainly to FIG. 2. The numeral 10 represents a metal guide rail. The numeral 12 denotes a synthetic resin guide rail. These guide rails 10 and 12 are elongate members each extending in one direction. The guide rails are fitted in such a way that the longitudinal directions thereof are set as vertical directions to the vehicle.

The metal guide rail 10 includes brackets 14 and 16 extending from upper and lower parts thereof. Bored in the upper and lower brackets 14 and 16 are bolt holes 18 and 20 for fixing the guide rail 10 to a center pillar (not illustrated) of the vehicle.

The synthetic resin guide rail 12 has a tongue piece 22 protruding at one end in the longitudinal direction and also a protrusion 24 protruding from a plate surface at the other end (lower end). The tongue piece 22 is inserted into a slit-like opening (not shown) formed in a root part of the bracket 14. The protrusion 24 is fitted in a small hole 26 formed in the lower end portion of the metal guide rail 10. The tongue piece 22 and the protrusion 24 are fitted therein, whereby the synthetic resin guide rail 12 becomes integral with the metal guide rail 10 while being overlapped with each other.

Slots 28 and 30 extending in the longitudinal directions are so formed in the guide rails 10 and 12 that the slots coincide with each other in the overlapped state.

The metal guide rail 10 assumes such a configuration as to form a flange 32 the outer fringes of which are folded. The flange 32 has pawls 34 so disposed at predetermined intervals as to project thereform. Recesses 36 are formed between the respective pawls 34.

The synthetic resin guide rails 12 assumes such a configuration that longer side portions along the slot 30 are folded. A side-folded flange 38 is formed with notches 40 at predetermined intervals. Protrusions 42 are shaped between the notches 40.

This notch 40 has a cut-in edge part (hereinafter referred to as a vertical surface in some cases) 44 positioned on the underside when the shoulder adjuster is mounted in the vehicle, this cut-in edge part being orthogonal to the guide rail 12. The notch 40 also has a cut-in edge part (hereinafter referred to as an inclined surface in some cases) 46 positioned on the upside and so obliquely orthogonal to the longitudinal direction of the guide rail 12 as to expand the aperture of the notch 40.

Note that the pawls 34 are arrayed and have their sizes adaptive to be concealed behind the protrusions 42 when viewing them sideways in a state where the guide rails 10 and 12 are joined.

Provided is a slide member 50 movable in the longitudinal directions along the integrally arranged guide rails 10 and 12. This slide member 50 is composed mainly of a metal slider 52, a synthetic resin slide 54 and a nut 56 serving as an anchor fitting part. As illustrated in FIG. 1, a shoulder anchor 57 is fastened to the nut 56 with a bolt 57A. A seat belt 57B is stretched through the shoulder anchor 57.

The metal slider 52 assumes a substantially C-like shape in section. The slider 52 includes a side-folded flange 52a disposed along the outer side surfaces of the flange 32 of the metal guide rail 10. The synthetic resin slider 54 assumes a substantially C-like shape adaptive to fit in the metal slider 52. A side-folded flange 54a thereof is interposed between the flanges 32 and 52a, thus hindering a direct metal touch of the metal slider 52 to the metal guide rail 10.

Apertures 58 and 60 for an insertion stop of the nut 56 are formed in the sliders 52 and 54 so that these apertures open in coincident positions while the sliders 52 and 54 are superposed on each other. Similarly, the sliders 52 and 54 are formed with through-holes 64 and engagement holes 62 into which the pawls 34 of the metal guide rail 10 are inserted. The synthetic resin slider 54 has trapezoidal engaging parts 66 protruded to extend along the two side portions of the aperture 60.

The nut 56 is inserted through the apertures 58, 60, the slot of the synthetic resin guide rail 12 and the slot 28 of the metal guide rail 10. A slide washer 68, a spring 70 and a stop ring 72 are externally fitted to the top end of the nut 56. A C-ring 74 is fitted in a peripheral groove 76 furrowed in the top end portion of the nut 56, whereby the spring 70 is mounted on the nut 56.

As illustrated in FIGS. 1, 3 and 4, when the slide member 50 engages with the guide rails 10 and 12 in a shift hindrance state, the engaging parts 66 of the synthetic resin slider 54 engage with the notches 40 of the synthetic resin guide rail 12. In this state, the spring 70 biases the nut 56 upwards in FIG. 3 through the stop ring 72 and C-ring 74. Hence, the engaging parts 66 are biased by the spring 70 in the insert direction into the notches 40. In this state, vertical surfaces 66a of the engaging parts 66 engage with the vertical cut-in edge parts 44 of the notches 40, with the result that the slide member 50 is hindered from being lowered in the down direction (arrowed direction B).

In this state, when pushing the nut 56 upwards (arrowed direction A), inclined surfaces 66b of the engaging parts 66 slide along inclined surfaces 46 of the notches 40. The inclined surfaces 66b, as indicated by an arrowhead U of FIG. 4, run over the protrusions 42 and enter the notches 40 adjacent thereto. Subsequently, when pushing further the nut 56 upwards, the slide member 50 is pushed up to a desired height (i.e., moved in the arrowed direction A). Upon a release from the hand, the engaging parts 66 engage with the notches 40 substantially at that place and then stop. In this state, the vertical surfaces 66a impinge on the vertical surfaces 44, and it follows that the slide member 50 remains stopped.

The slide member 50 may be pulled down (arrowed direction B) by intruding the nut 56. Namely, if pulled down in this way, as indicated by D of FIG. 4, the synthetic resin slider 54 moves in the release direction till the vertical surfaces 66a of the engaging parts 66 come out of the vertical surfaces 44 of the notches 40. Subsequently, the slider 54 slides downwards (direction B). The slide member 50 continues to slide downwards till the hand releases from the nut 56. The engaging parts 66 enter the notches 40 upon the release from the hand. At that place, the slide member 50 is engaged with the guide rail 12.

The slide member 50 can be stopped at the desired height in the manner discussed above. When the vehicle is in a normal state, the engaging parts 66 of the synthetic resin slider 54 engage with the notches 40 of the synthetic resin guide rail 12. The slide member 50 is thereby stopped at the predetermined height. Then, shoulder anchor of the seat belt device is held at that height.

In this state, if an emergence (e.g., collision) happens in the vehicle, an intensive pull-down force is exerted on the nut 56 through the shoulder anchor and the seat belt. Deformed slightly at this time are the protrusions 42 of the synthetic resin guide rail 12 and the engaging parts 66 of the synthetic resin slider 54. The pawls 34 of the metal guide rail 10 impinge directly on side surface portions 62a of the engagement holes 62 of the metal slider 52. As a result, there is developed a state where the metal slider 52 having a high rigidity engages directly with the metal guide rail 10 having a high rigidity. Hence, this shoulder adjuster gives a resistance against a large acceleration to be applied to a human body. Thus, the human body can be strongly restrained.

Note that when sliding the slide member 50, the synthetic resin slider 54 impinges on the synthetic resin guide rail 12 with no metal touch. For this reason, working sounds caused during the slide are small, and no metal sound is generated even when vibrations of the vehicle are conveyed.

Figure 5:
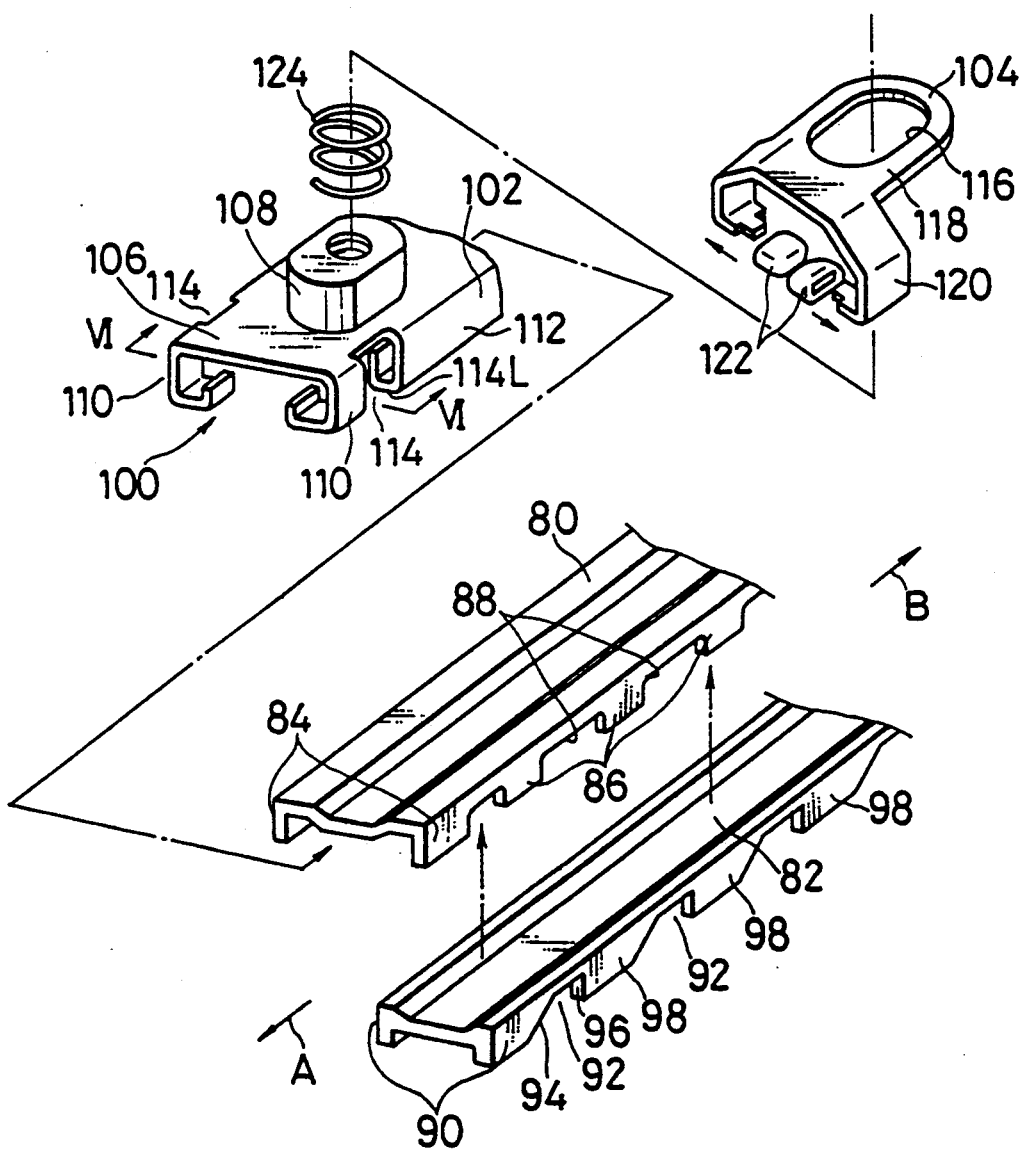
FIG. 5 is a perspective view showing an assembly of the shoulder adjuster in another embodiment of this invention.
Figure 6:
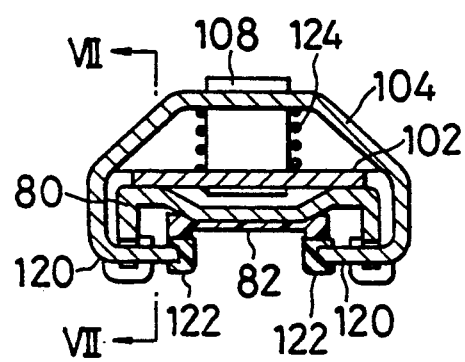
FIG. 6 is a sectional view depicting the same shoulder adjuster.
Figure 7:
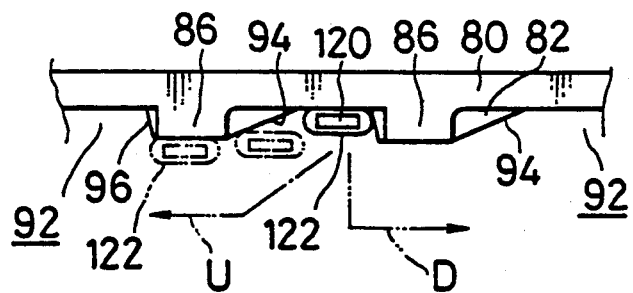
FIG. 7 is a view of assistance in explaining the operation.

FIG. 5 is an exploded prespective view illustrating the shoulder adjuster in a fourth mode of the embodiment according to the present invention. FIG. 6 is a sectional view (taken substantially along the line VI—VI of FIG. 5) showing an assembled state and also an engaged state of the slide member. FIG. 7 is an operation explanatory sectional view (taken substantially along the line VII—VII of FIG. 6) illustrating the shoulder adjuster in this embodiment.

The numeral 80 represents a metal guide rail; and 82 a synthetic resin guide rail. The metal guide rail 80 assumes a substantially C-like. Configuration in section. A side-folded flange 84 has pawls 86 protruded therefrom. Recesses 88 are formed between the pawls 86. The synthetic resin guide rail 82 also assumes a substantially C-like configuration in section. A side-folded flange 90 is formed with notches 92 at predetermined intervals in the longitudinal direction. This shoulder adjuster is mounted in the vehicle in such a way that the arrowed direction B is set downwards. In this state, a cut-in edge part 94 directed upwards has an inclined surface obliquely orthogonal to the longitudinal direction of the guide rail 82. Note that the upper cut-in edge part 94 will hereinafter referred to as an inclined surface, while a lower cut-in edge part 96 will be referred to as a vertical surface in some cases. Designated at 98 is a protrusion formed between the notches 92.

The synthetic resin guide rail 82 has a width adapted to internally fit in the metal guide rail 80. The two guide rails engage with each other so that the notches 92 coincide with the recesses 88, thus making these rails integral. A slide member 100 is provided to embrace the integral guide rail 80 and 82 from outside. This slide member 100 is composed mainly of a metal slider 102 and a metal lock plate 104. The slider 102 includes a base part 106 assuming a substantially C-like shape and a nut 108 serving as an anchor fitting part integrally formed with the base part 106. Flanges 110 and 112 are provided at right and left side edge portions. A slit 114 is formed between the flanges 110 and 112. The flanges 110 and 112 have their edges each crooked in an L-shape. The L-shaped parts 114L embrace the flanges 84, 90 of the guide rails 80 and 82, whereby the slide 102 is slidable along the guide rails 80 and 82.

The lock plate 104 includes: a body unit 118 formed with an aperture 116 through which the nut 108 is inserted; and a pair of arms 120 overhanging from the body unit 118. The arms 120 engage with slits 114, thus embracing the base part 106 of the slider 102. Edges of the pair of arms 120 are folded back in such directions to approach each other. Synthetic resin caps 122 (silent caps) are covered on these edges. As illustrated in FIG. 7, the silent cap 122 has a size enough to engage with the notch 92 of the guide rail 82. The pawls 86 have a size and are, as is obvious from FIG. 7, disposed to be concealed behind protrusions 98 of the synthetic resin guide rail 82.

As depicted in FIG. 6, when the lock plate 104 engages with the slider 102, a coil spiring 124 is interposed between the base part 106 and the body unit 118. This spring 124 is externally fitted to the nut 108.

In the thus constructed shoulder adjuster, a shoulder anchor (not shown) is fixed to the nut 108 with a bolt. A seat belt is inserted in this shoulder anchor.

This shoulder adjuster is attached to a center pillar of the vehicle so that an arrowed direction A of FIG. 5 is set upwards, whereas an arrowed direction B is set downwards. Where the vehicle is in the normal state, as illustrated in FIG. 7A, the silent cap 122 impinges on the vertical surface 96 of the notch 92 of the synthetic resin guide rail 82. The slide member 100 is thereby positioned at a predetermined height. Note that the spring 124 biases the lock plate 104 in this locked state, and the silent cap 122 is intruded into the notch 92. Hence, it follows that the slide member 100 remains in the predetermined position.

In the case of moving the slide member 100 upwards, the slide member 100 may be simply pushed up. More specifically, when thrusting up the slide member 100, as indicated by an arrowhead U of FIG. 7, the silent cap 122 moves along the inclined surface 94 of the synthetic resin guide rail 82. The silent cap 122 then runs over the protrusion 98 and moves upwards. After pushing up the slide member 100 up to a desired height, the silent cap 122 enters the notch 92 upon a release of the hand. The slide member 100 is thereby locked.

On the occasion of pulling down the slide member 100, the lock plate 104 may be intruded and at the same moment pulled down. In this case, as indicated by an arrowhead D, the silent cap 122 at first moves in a release direction along the vertical surface 96 of the notch 92 and subsequently runs over the protrusion 98.

In this manner, the slide member 100 can be positioned at the desired height simply by thrusting up the slide member 100 or slightly intruding and pulling down the lock plate 104. On the occasion of this movement, the synthetic resin silent cap 122 slides along the synthetic resin guide rail 82. The working sounds are therefore extremely small. Besides, the synthetic resin silent cap 122 engages with the notch 92 of the synthetic resin guide rail 82 even in the locked state. Even when causing vibrations of the vehicle, vibrating sounds are not produced from the shoulder adjuster at all.

In this locked state, when an emergency such as a collision of the vehicle takes place, the silent cap 122 and the cut-in edge part 96 of the synthetic resin guide rail 82 are deformed by pressure. The arms 120 of the metal lock plate 104 impinge directly on the pawls 86 of the metal guide rail 80, whereby a rigid holding state is developed. It is therefore possible to strongly restrain the seat occupants in the vehicle.

Figure 8:
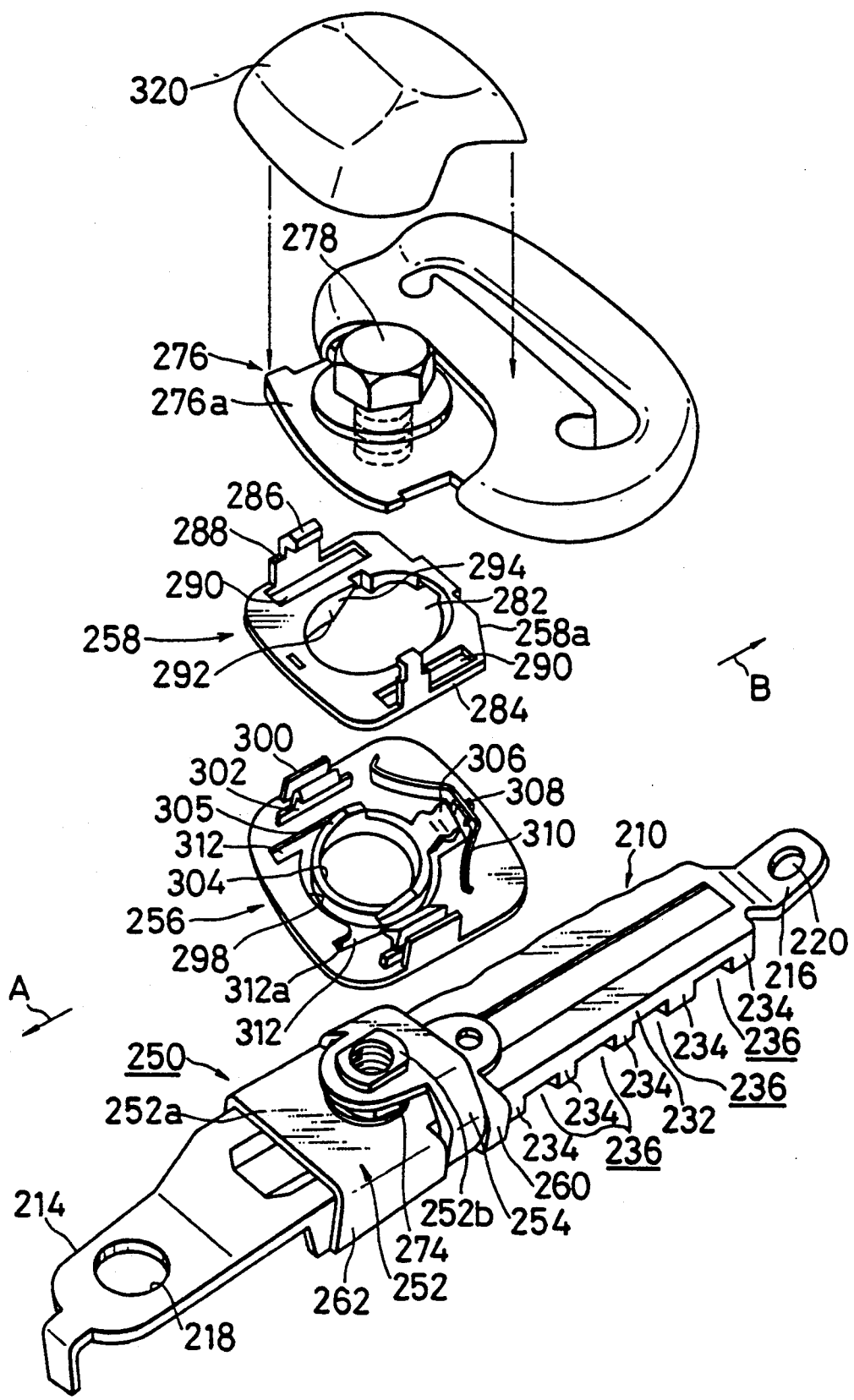
FIG. 8 is a perspective view showing an assembly of the shoulder adjuster in still another embodiment of this invention.
Figure 9:
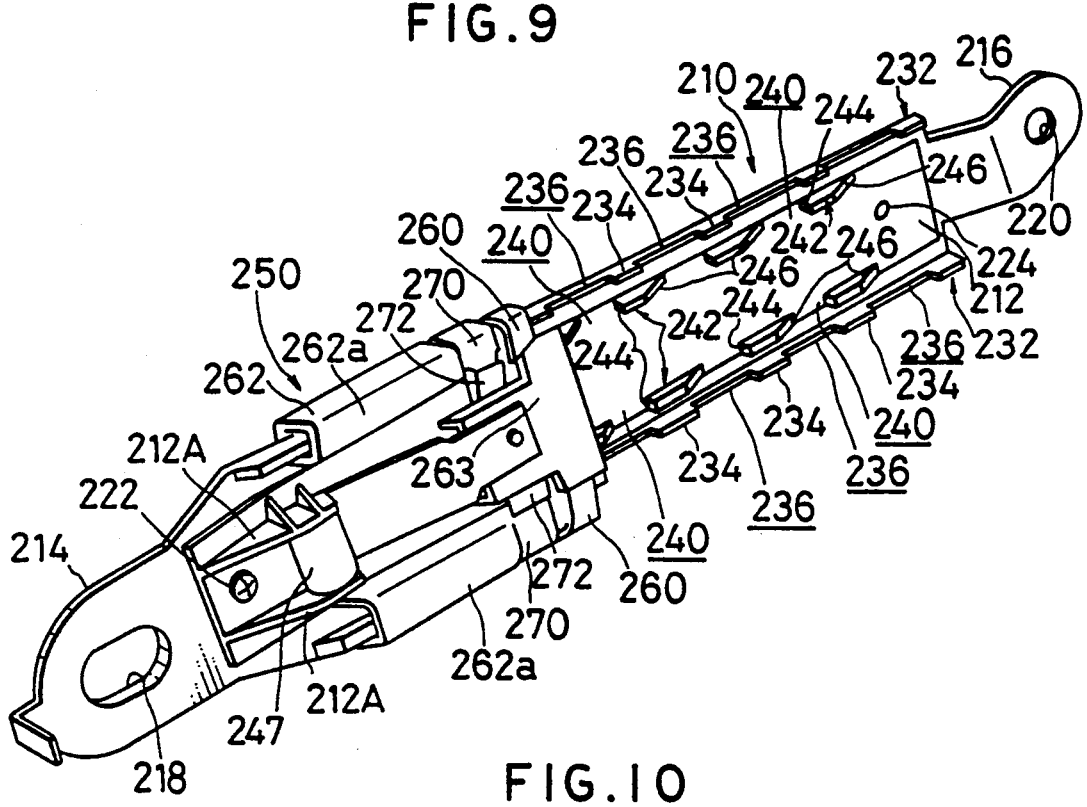
FIG. 9 is a perspective view illustrating the bottom surface fo a guide plate.
Figure 10:
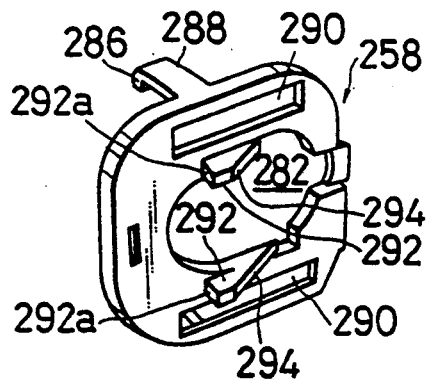
FIG. 10 is a perspective view illustrating the bottom surface of a slide plate.
Figure 11:
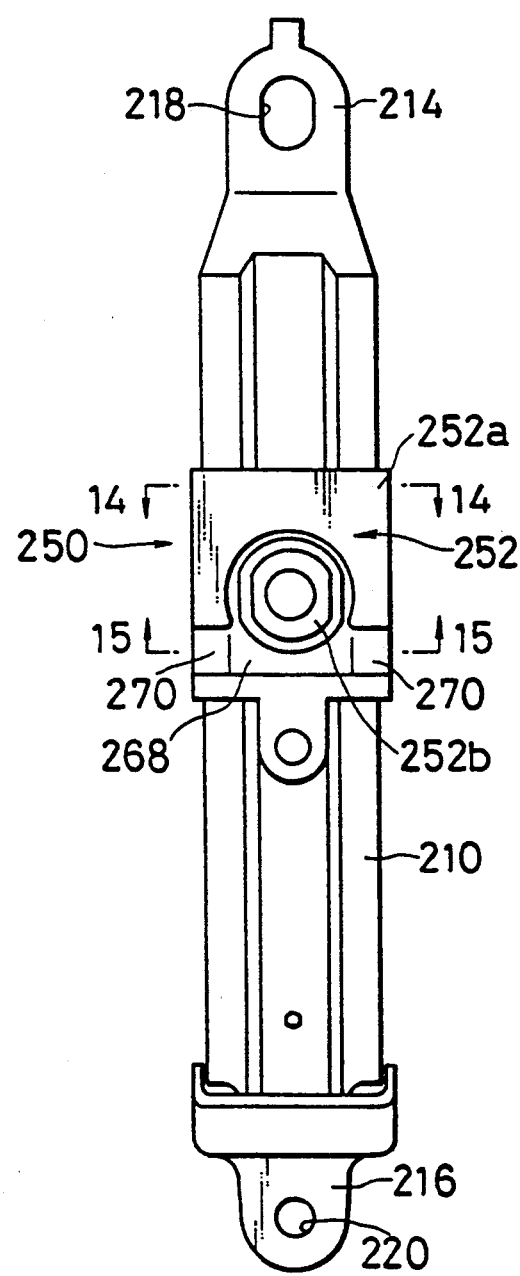
FIG. 11 is a front elevation depicting the shoulder adjuster.
Figure 12:
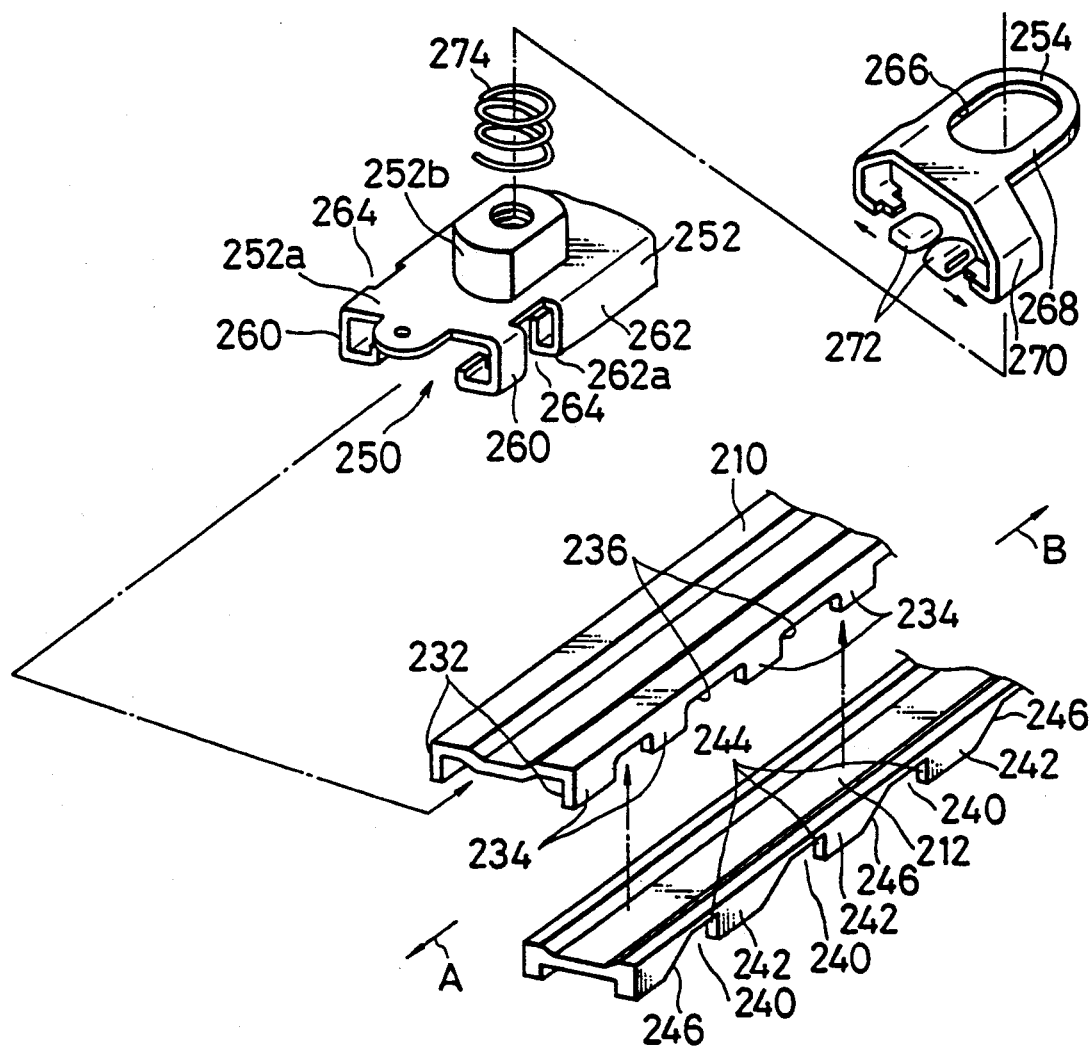
FIG. 12 is a perspective view showing a state where the slide member is fabricated.
Figure 13:
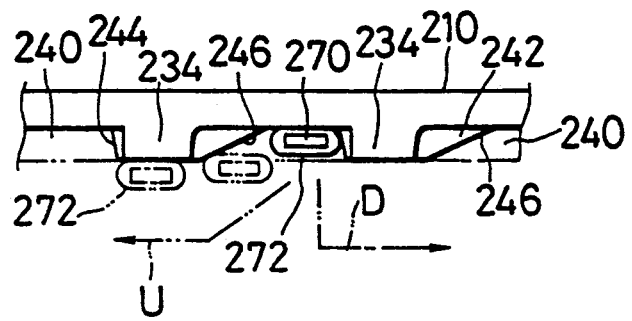
FIG. 13 is a view of assistance in explaining an engagement of the slide member with the guide rail.
Figure 14:
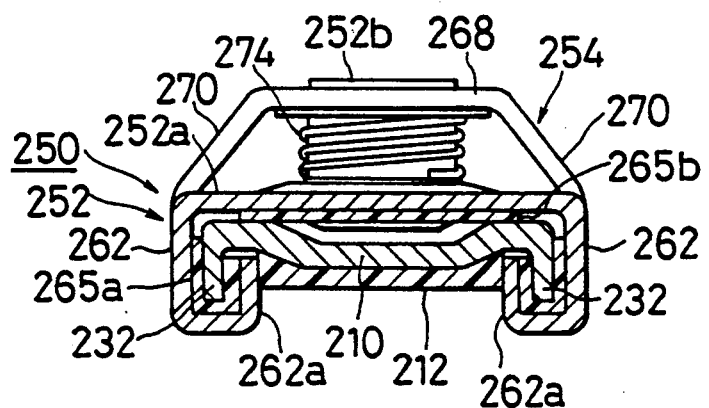
FIG. 14 is a sectional view taken substantially along the line 14—14 of FIG. 11.
Figure 15:
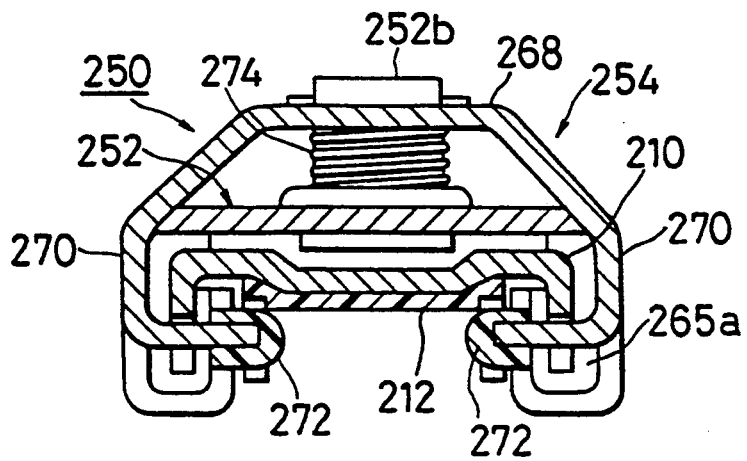
FIG. 15 is a sectional view taken substantially along the line 15—15 of FIG. 11.

FIG. 8 is a perspective view depicting an assembly of the shoulder adjuster in a fifth mode of the embodiment according to the present invention. FIG. 9 is a perspective view illustrating a bottom of the guide plate. FIG. 10 is a perspective view showing a bottom of the slide plate. FIG. 11 is a front elevation illustrating the principal portion of the shoulder adjuster. FIG. 12 is a perspective view showing a fabrication of the slide member. FIG. 13 is a diagram of assistance in explaining an engagement of the slide member with the guide rail. FIG. 14 is a sectional view taken substantially along the line 14—14 of FIG. 11. FIG. 15 is a sectional view taken substantially along the line 15—15 of FIG. 11. FIGS. 16 and 17 are diagrams of assistance in explaining operations of the shoulder adjuster.

The numeral 210 represents a metal guide rail; and 212 a synthetic resin guide rail. These guide rails 210 and 212 are elongate members each extending in one direction. The guide rails are fitted in such a way that the longitudinal directions thereof are set as vertical directions to the vehicle. The metal guide rail 210 includes brackets 214 and 216 extending from upper and lower parts thereof. Bored in the upper and lower brackets 214 and 216 are bolt holes 218 and 220 for fixing the guide rail 210 to a center pillar (not illustrated) of the vehicle.

The synthetic resin guide rail 212 is made integral with the metal guide rail 210 while being overlapped with each other by using a machine screw 222 and a rivet 224 (FIG. 9).

The metal guide rail 210 assumes a configuration to form side-folded flange 232. This flange 232 is provided with pawls 234 at predetermined intervals. Recesses 236 are formed between the pawls 234.

The synthetic resin guide rail 212 is provided with protrusions 242 at predetermined intervals along the longer side portions. Notches 240 are formed between the protrusions 242.

This notch 240 has a cut-in edge part (hereinafter referred to as a vertical surface in some cases) 244 positioned on the underside when the shoulder adjuster is mounted in the vehicle, this cut-in edge part being orthogonal to the guide rail 212. The notch 240 also has a cut-in edge part (hereinafter referred to as an inclined surface in some cases) 246 positioned on the upside and so obliquely orthogonal to the longitudinal direction of the guide rail 212 as to expand the aperture of the notch 240.

Note that the synthetic resin guide rail 212 has a width adaptive to internal fitting in the metal guide rail 210. The pawls 234 are have a size and disposed to be concealed behind the protrusions 242.

As illustrated in FIG. 9, the synthetic resin guide rail 212 is provided integrally with a pair of brackets 212A. The guide rail 212 also includes a helical coil spring 247 stretched between the brackets 212A, 212A. The top end of this spring 247 is caught by a slide member 250 which will be mentioned latter, whereby the slide member 250 is biased upwards.

Provided is the slide member movable in the longitudinal direction along the integrally arranged guide rails 210 and 212. This slide member 250 consists mainly of a metal slider 252, a metal lock plate 254, a synthetic resin fixed plate 256 and a synthetic resin slide plate 258 serving as an operator. The slider 252 includes a base part 252a assuming a substantially C-like shape and a nut 252b serving as an anchor fitting part provided integrally with the base part 252a. Flanges 260 and 262 are provided at the right and left side edge portions of the base part 252a. Slits 264 are formed between the flanges 260 and 262. The flange 260 assumes such a configuration that the top end thereof is bent in parallel with the base part 256. The flange 262 assumes such a configuration that the top end thereof is bent in an L-shape.

A synthetic resin slide piece 263 is provided in such a way that both ends thereof are held by the pair of flanges 260. This slide piece 263 is slidable along a main plate surface of the synthetic resin guide rail 212. The top end of the helical coil spring 247 is secured to this slide piece 263.

An L-shaped part 262a of the top end of the flange 262 embraces the flange 232 of the guide rail 210. The slide 252 is thereby slidable along the guide rail 210.

Note that the symbols 265a, 265b in FIG. 14 represent synthetic resin spacers provided on an inner peripheral surface of the slider 252.

The lock plate 254 includes: a body unit 268 formed with an aperture 266 into which the nut 252b is inserted; and a pair of arms 270 overhanging from the body unit 268. The arms 270 engage with the slits 264 to embrace the side edge of the base part 252a of the slider 252.

The top ends of the pair of arms 270 are folded back in such directions as to approach each other. The top ends of the arms 270 are covered with synthetic resin caps (silent caps) 272. As illustrated in FIG. 13, this silent cap 272 has a size adaptive to fitting into the notch 240 of the guide rail 212. As is obvious from FIG. 13, pawls 234 have a size and disposed to be concealed behind protrusions 242 of the synthetic resin guide rail 212.

As shown in FIGS. 12, 14 and 15, when the lock plate 254 engages with the slider 252, a coil spring 274 serving as an elastic member is interposed between the base part 252a and the body unit 268. This spring 274 is fitted externally to the nut 252b.

In this shoulder adjuster, an anchor plate 276a of a shoulder anchor 276 is swayably attached to the nut 252b with a bolt 278. A seat belt 280 (FIGS. 16, 17) is inserted through the shoulder anchor plate 276a. A cover 320 is put to cover this bolt.

This slide plate 258 takes a substantially tabular configuration, whereas the plate 258 has, as depicted in FIGS. 8 and 10, an aperture 282 at the center thereof. A protrusion 288 with a pawl 286 is provided at a side edge 284. The pawl 286 and the protrusion 288 are intended to stop a cover 320. A slit 290 is formed along the side edge 284. A pressurizing member 292 formed of a trapezoidal protrusion extending in the same extending direction of the slit 290 is provided along the central aperture 282. An inclined surface 294 corresponding to an oblique side of the trapezoid is defined as a pressurizing surface.

The fixed plate 256 assumes a substantially tabular configuration, wherein an aperture 298 is formed at the center thereof, and guide walls 300, 302 are shaped at the side edge thereof. A ring-like pressure receiving member 304 is disposed in the aperture 298. The fixed plate 256 and the pressure receiving member 304 become integral through a soft undulate connecting member 306. Note that the pressure receiving member 304 becomes integral with the fixed plate 256 through the undulate connecting member 306 and is therefore movable in a direction vertical to the surface of the fixed plate 256.

The fixed plate 256 is provided with a leaf spring stopper 308. Provided is a leaf spring 310 stopped by this stopper 308. The leaf spring 310, as will be mentioned later, impinges on a rear end surface 258a of the slide plate 258 when the slide plate 258 engages with the fixed plate 256. The leaf spring 310 incorporates a function to bias the slide plate 258 in an arrowed direction A.

The following is a description of how the fixed plate 256, the slide plate 258 and the shoulder anchor 276 are assembled. To be specific, the side edge 284 of the slide plate 258 is interpolated between the guide walls 300 and 302 of the fixed plate 256. An upper end of the guide wall 302 passes through the slit 290 and jets out of an upper surface of the slide plate 258. An anchor plate 276a of the shoulder anchor 276 is superposed on the slide plate 258. A bolt 278 is screwed into a nut (anchor fitting part) 252b via the apertures 282, 298 of the slide plate 258 and the fixed plate 256. Then, the anchor plate 276a presses the upper end of the guide wall 302, whereby the fixed plate 256 and the shoulder anchor 276 become integral with the slider 252.

In this state, the side edge 284 of the slide plate 258 is held by the guide walls 300 and 302 of the fixed plate 256, and it follows that the slide plate 258 becomes movable in arrowed directions A and B.

Note that the pressurizing member 292 engages with a slit 312 formed to communicate with the aperture 298 of the fixed plate 256. When the slide plate 258 moves to and fro in the arrowed directions A and B, the top end of the pressurizing member 292 shifts in an interior of this slit 312. When the slide plate 258 shifts up to an advance limit in the arrowed direction A, an end surface 292a (FIG. 10) of the pressurizing member 292 impinges on an end surface 312a (FIG. 8) of the slit 312. A further shift of the slide plate 258 is thereby hindered.

When the slide plate 258 is moved in the arrowed direction B, a pressurizing surface 294 engages with a pressure receiving surface 305 to thrust down the pressure receiving member 304. Then, the pressure receiving member 304 pushes down the lock plate 254, thereby releasing the arms 270 with the silent caps 272 from the notches 240.

Hence, the slide member 250 is movable in the arrowed direction B along the guide rails 210 and 212 by moving the slide plate 258 in the arrowed direction B.

This shoulder adjuster is attached to the center pillar of the vehicle in such a manner that the direction A in FIGS. 8 and 12 is set upwards, whereas the direction B is set downwards. Where the vehicle is in the normal state, as illustrated in FIGS. 13 and 15, the arms 270 with the silent caps 272 impinge on vertical surfaces 244 of the notches 240 of the synthetic resin guide rail 212. The slide member 250 is thereby locked at a predetermined height. Note that in this locked state, the spring 274 biases the lock plate 254. Top ends of the arms 270 with the silent caps 272 are intruded into the notches 240. Therefore, the slide member 250 remains in this predetermined position.

In the case of moving up the slide member 250, the slide member 250 may, as illustrated in FIG. 17, be pushed up. More specifically, when pushing up the slide member 250, as indicated by an arrowhead U of FIG. 13, the top ends of the arms 270 with the silent caps 272 move along the inclined surface 246 of the synthetic resin guide rail 212. The top ends thereof eventually run over the protrusions 242 and move upwards. After pushing up the slide member 250 up to a desired height, the top ends of the arms 270 enter the notches 240 upon a release of the hand, whereby the slide member is brought into a locked state.

In the case of pulling down the slide member 250, the slide plate 258 may be pushed down by, as depicted in FIG. 16, depressing the cover 320. In this case, as described above, the pressurizing surface 294 thrusts the pressure receiving surface 305 with a shift of the slide plate 258. The pressure receiving member 304 is thereby pressed. Then, the lock plate 254 is moved by this pressing force. As indicated by an arrowhead D of FIG. 13, the lock plate 254 and the top ends of the arms 270 at first move in the release direction along the vertical surfaces 244 of the notches 240, subsequently run over the protrusions 298 and shift downwards.

As in the manner described above, the slide member 250 can be moved up to the desired height simply by pushing up the slide member 250 or pushing down the slide plate 258 (in effect, the cover 320).

On the occasion of this movement, the synthetic resin silent caps 272 slide on the synthetic resin guide rail 212. Besides, synthetic resin spacers 265a, 265b are provided, and at the same time the synthetic resin slide piece 263 slides on the synthetic resin guide rail 212. For this reason, the working sounds are very small. Moreover, the synthetic resin silent caps 272 engage with the notches 244 of the synthetic resin guide rail 212 even in the locked state. Even when causing the vibrations of the vehicle, no vibration sound is produced from the shoulder adjuster.

In this locked state, if an emergency such as a collision of the vehicle happens, the synthetic resin silent caps 272 and the protrusions 242 are deformed by pressure. The arms of the metal lock plate 254 impinge directly on the pawls 234 of the metal guide rail 210, whereby a strong holding state is developed. It is therefore possible to strongly restrain the seat occupants of the vehicle.

As discussed above, the shoulder adjuster of this invention causes extremely small working sounds when moving the slide member. In addition, it is feasible to strongly restrain the seat occupants in the event of emergency. Besides, when the lead during the emergency is released, the silent operation is, as usual, attainable.

The shoulder adjuster especially in the third mode eliminates the necessity for the member for thrusting the engaging parts in the release direction. Additionally, the slide member can be pushed up simply by pushing up the slide member. Further, the slide member can be lowered simply by slightly intruding and pulling down the slide member.

In the shoulder adjuster in the fifth mode, the slide member can be pushed up simply by thrusting up the slide member. The operator of the slide member is merely pushed down, thereby pulling down the slide member. Hence, it is possible to adjust the installing height of the shoulder anchor quite simply. Besides, the operating method can be understood without referring to the operation manual, which is highly convenient.

Although the illustrative embodiments of the present invention have been described in detail with reference to the accompanying drawings, it is to be understood that the present invention is not limited to those embodiments. Various changes or modifications may be effected therein by one skilled in the art without departing from the scope or spirit of the invention.

What is claimed is:

1. A shoulder adjuster comprising:
    a guide rail fitted so that the longitudinal direction is set as a vertical direction to a vehicle and provided with a plurality of notches formed at intervals in the longitudinal direction; and
    a slide member slidable in the longitudinal direction of said guide rail and having engaging parts engaging with said notches and a shoulder anchor fitting part, characterized by said guide rail being consisted of a synthetic resin guide rail and a metal guide rail so that said slide member engages with said synthetic resin guide rail during a non-emergency, and during an emergency said synthetic resin guide rail is deformed to make said slide member engage with said metal guide rail.

2. The shoulder adjuster as set forth in claim 1, wherein said synthetic resin guide rail is disposed in rear of said metal guide rail, said guide rails are formed with slots extending in their longitudinal directions, and said anchor fitting part is disposed to pass through said slots.

3. The shoulder adjuster as set forth in claim 2, wherein a slide surface of said slide member with respect to said synthetic resin guide rail is composed of a synthetic resin.

4. The shoulder adjuster as set forth in claim 2, wherein said metal guide rail has a flange side edges of which are folded in a rear direction of said guide rail, said flange is formed with notches to thereby provide pawls at constant pitches, protrusions are provided at edge portions along said slot of said synthetic resin guide rail at said pitches in the rear direction of said guide rail, and said metal pawls are concealed behind said protrusions when viewed from side surface in a state where said guide rails are joined.

5. The shoulder adjuster as set forth in claim 2, wherein said notches of said synthetic resin guide rail have cut-in edge parts, said lower cut-in edge parts in up-and-down directions are substantially orthogonal to the longitudinal direction of said guide rail, and said upper cut-in edge parts in the up-and-down directions are obliquely orthogonal to the longitudinal direction thereof to expand apertures of said notches, and wherein said slide member includes said anchor fitting part possible of advancement and retreatment in the engaging direction and an elastic member for biasing said anchor fitting part in the engaging direction, and said engaging parts are integral with said anchor fitting part and biased by said elastic member in the engaging direction.

6. The shoulder adjuster as set forth in claim 2, wherein said notches of said synthetic resin guide rail have cut-in edge parts, said lower cut-in edge parts in the up-and-down direction are substantially orthogonal to the longitudinal direction of said guide rail, and said upper cut-in edge parts in the up-and-down direction are obliquely orthogonal to the longitudinal direction thereof to expand apertures of said notches, and wherein said slide member includes engaging parts so provided on said anchor fitting part as to be advanceable and retreatable in the engaging direction and also an elastic member for biasing said engaging parts in the engaging direction, and said engaging parts are provided separately from said anchor fitting part and biased by said elastic member in the engaging direction.

7. The shoulder adjuster as set forth in claim 2, wherein said notches of said synthetic resin guide rail have cut-in edge parts, said lower cut-in edge parts in up-and-down directions are substantially orthogonal to the longitudinal direction of said guide rail, and said upper cut-in edge parts in the up-and-down directions are obliquely orthogonal to the longitudinal direction thereof to expand apertures of said notches, and wherein said slide member include: a pressure receiving member, having an inclined pressure receiving surface inclined upwards in the up-and-down directions with respect to the engaging direction of said engaging parts, for pressing said engaging parts in such a direction as to release from said notches during a shift in the engaging direction, an elastic member; an elastic member for biasing said engaging parts in the engaging direction; and an operator having an inclined pressurizing surface slide-contacting said inclined pressure receiving surface and advanceable and retreatable in the up-and-down directions.

8. The shoulder adjuster as set forth in claim 4, wherein said slide member includes: a U-shaped metal slider for embracing said guide rail from underside, a synthetic resin slider interposed between said metal slider and said synthetic resin guide rail; apertures formed in such positions as to coincide with said sliders; a nut serving as an anchor fitting part passing through said apertures and penetrating said metal guide rail from the surface thereof up to the rear surface of said metal slider; synthetic resin engaging parts, provided on said synthetic resin slider, for engaging with protrusions of said synthetic resin guide rail; and engagement holes, so formed in said metal slider as to extend in a slide direction thereof, into which pawls of said metal guide rails inserted, said synthetic resin engaging parts impinging on said synthetic resin protrusions in a normal state, said metal pawls impinge directly on said engagement holes of said metal slider in the event of emergency such as a vehicle collision.

9. The shoulder adjuster as set forth in claim 4, wherein said slide member includes: a slider having flanges, formed at its side edges, for embracing said metal guide rail and said synthetic resin guide rail from the surface thereof; slits so formed in said flanges as to extend from the surface of said guide rail to the underside thereof; a nut serving as an anchor fitting part provided on the surface of said slider; a metal lock plate having a pair of arms passing through said slits and extending up to the underside of said synthetic resin guide rail; and synthetic resin caps put on the top ends of said arms, said caps impinging on said synthetic resin protrusions in a normal state, said arms impinging directly on said metal pawls in the event of emergency such as a collision.

* * * * *